(12) United States Patent
Jochumson

(10) Patent No.: US 9,947,321 B1
(45) Date of Patent: Apr. 17, 2018

(54) REAL-TIME INTERACTIVE VOICE RECOGNITION AND RESPONSE OVER THE INTERNET

(71) Applicant: Pearson Education, Inc., New York, NY (US)

(72) Inventor: Christopher S. Jochumson, Novato, CA (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

(21) Appl. No.: 15/438,096

(22) Filed: Feb. 21, 2017

Related U.S. Application Data

(60) Continuation of application No. 14/828,399, filed on Aug. 17, 2015, now Pat. No. 9,653,082, which is a continuation of application No. 13/407,611, filed on Feb. 28, 2012, now Pat. No. 9,111,541, which is a continuation of application No. 12/942,834, filed on Nov. 9, 2010, now Pat. No. 8,126,719, which is a continuation of application No. 11/925,584, filed on Oct. 26, 2007, now Pat. No. 7,831,422, which is a division of application No. 10/711,114, filed on Aug. 24, 2004, now Pat. No. 7,330,815, which is a continuation of application No. 10/199,395, filed on Jul. 19, 2002, now Pat. No. 6,865,536, which is a continuation of application No. 09/412,043, filed on Oct. 4, 1999, now Pat. No. 6,453,290.

(51) Int. Cl.
| | |
|---|---|
| *G10L 15/30* | (2013.01) |
| *G09B 7/08* | (2006.01) |
| *G09B 19/04* | (2006.01) |
| *G10L 13/08* | (2013.01) |
| *G10L 15/22* | (2006.01) |
| *G10L 19/00* | (2013.01) |

(52) U.S. Cl.
CPC .............. *G10L 15/30* (2013.01); *G10L 13/08* (2013.01); *G10L 15/22* (2013.01); *G10L 19/00* (2013.01)

(58) Field of Classification Search
CPC ....... G10L 15/01; G10L 15/26; G10L 15/265; G10L 15/30; G10L 2015/225; G09B 7/08; G09B 19/04
USPC ...... 704/235, 236, 270, 270.1, 275; 434/185
See application file for complete search history.

(56) References Cited

U.S. PATENT DOCUMENTS

| | | | | |
|---|---|---|---|---|
| 5,638,487 | A | * | 6/1997 | Chigier ................... G10L 15/04 704/253 |
| 5,684,924 | A | * | 11/1997 | Stanley ................... G10L 15/26 704/233 |
| 5,944,778 | A | * | 8/1999 | Takeuchi .............. G06F 9/4887 718/100 |

(Continued)

*Primary Examiner* — Martin Lerner
(74) *Attorney, Agent, or Firm* — Quarles and Brady LLP

(57) ABSTRACT

Methods and systems for handling speech recognition processing in effectively real-time, via the Internet, in order that users do not experience noticeable delays from the start until they receive responsive feedback. A user uses a client to access the Internet and a server supporting speech recognition processing. The user inputs speech to the client, which transmits the user speech to the server in approximate real-time. The server evaluates the user speech, and provides responsive feedback to the client, again, in approximate real-time, with minimum latency delays. The client upon receiving responsive feedback from the server, displays, or otherwise provides, the feedback to the user.

20 Claims, 10 Drawing Sheets

(56) References Cited

U.S. PATENT DOCUMENTS

| | | | | | |
|---|---|---|---|---|---|
| 5,960,399 | A | * | 9/1999 | Barclay | G10L 15/02 704/251 |
| 6,003,079 | A | * | 12/1999 | Friedrich | H04L 41/5035 709/223 |
| 6,017,219 | A | * | 1/2000 | Adams, Jr. | G09B 7/04 704/270 |
| 6,055,498 | A | * | 4/2000 | Neumeyer | G10L 15/26 704/240 |
| 6,112,221 | A | * | 8/2000 | Bender | G06F 9/4887 718/102 |
| 6,151,576 | A | * | 11/2000 | Warnock | G10L 15/26 704/235 |
| 6,223,201 | B1 | * | 4/2001 | Reznak | G06F 9/4843 718/102 |
| 6,408,272 | B1 | * | 6/2002 | White | G10L 15/30 704/270.1 |
| 7,058,573 | B1 | * | 6/2006 | Murveit | G10L 15/08 704/254 |
| 7,149,690 | B2 | * | 12/2006 | August | G09B 19/04 704/270 |
| 9,653,082 | B1 | * | 5/2017 | Jochumson | G10L 19/0018 |

* cited by examiner

REAL-TIME INTERACTIVE VOICE RECOGNITION AND RESPONSE OVER THE INTERNET

CROSS-REFERENCE TO RELATED APPLICATIONS

This patent application is a continuation of U.S. patent application Ser. No. 14/828,399, filed Aug. 17, 2015, now U.S. Pat. No. 9,653,082 issued May 16, 2017, which is a continuation of U.S. patent application Ser. No. 13/407,611, filed Feb. 28, 2012, issued as U.S. Pat. No. 9,111,541 on Aug. 18, 2015, which is a continuation of U.S. patent application Ser. No. 12/942,834, filed Nov. 9, 2010, issued as U.S. Pat. No. 8,126,719 on Feb. 28, 2012, which is a continuation of U.S. patent application Ser. No. 11/925,584, filed Oct. 26, 2007, issued as U.S. Pat. No. 7,831,422 on Nov. 9, 2010, which is a divisional of U.S. patent application Ser. No. 10/711,114, filed Aug. 24, 2004, issued as U.S. Pat. No. 7,330,815 on Feb. 12, 2008, which is a continuation of U.S. patent application Ser. No. 10/199,395, filed Jul. 19, 2002, issued as U.S. Pat. No. 6,865,536 on Mar. 8, 2005, which is a continuation of U.S. patent application Ser. No. 09/412,043, filed Oct. 4, 1999, issued as U.S. Pat. No. 6,453,290 on Sep. 17, 2002. These applications are incorporated by reference along with all other references cited in this application.

BACKGROUND OF THE INVENTION

The present invention pertains to the field of speech recognition, including, more particularly, speech recognition in real-time over the Internet.

In known systems and methods employing speech recognition, the speech recognition is performed entirely on a user's processing device, or client. As shown in FIG. 1, in known environments, a client 10 for a user 20 contains and processes all the applications required for speech recognition activities. These applications include an audio input application 30 for retrieving audio information from an audio device, e.g., a microphone, a speech recognition engine 40, for processing the input audio speech information and making determinations of what was spoken, and a specific speech recognition application program for coordinating one or more speech recognition activities 50.

In these known systems and methods, the audio input application 30, the speech recognition engine 40, and the speech recognition application program 50 must all be installed on the client 10. The speech recognition engine installation itself is generally very large and complex, and, thus, cannot be supported by many clients 10. Further, many users 20 do not want to be bothered with such a large, difficult installation, and, thus, will simply forgo speech recognition activities rather than initiate and maintain the necessary speech recognition engine installation.

Further, in these known systems and methods, the user 20 is thereafter limited to the speech recognition application program 50 installed on his or her client 10. An update or new speech recognition application program will require a new installation on every client 10 using the speech recognition application program 50. This program update or replacement can be troublesome, time consuming, and expensive, causing many users 20 to forgo use of speech recognition activities, ultimately resulting in the loss of goodwill and business for these applications.

Thus, it is desirable to have a system and method supporting speech recognition where clients are exposed to minimal, uncomplicated installations. It is also desirable to have a system and method for speech recognition over the Internet, so that anyone with a computing device, or client, and access to an Internet connection, may have access to speech recognition activities and processing. It is further advantageous to have a system and method for speech recognition that performs in real-time, or approximate real-time, in order that feedback is reported to users without detectable delays.

BRIEF SUMMARY OF THE INVENTION

The invention comprises a system and method for speech recognition processing in approximate real-time, over the Internet.

A system for supporting speech recognition processing, e.g., for language learning activities, comprises one or more clients and a server. Each client of the system comprises the capability to input audio speech from a user, and store the audio speech into one or more buffers. Each client also comprises the capability to encode, or otherwise compress, the buffers of received audio speech into a smaller data representation of the original input audio speech. Each client can encode a buffer of a portion of the inputted audio speech before all of the user's audio speech is input to the client. Each client can also package an encoded buffer of audio speech into one or more packets for transmission over the Internet, and thereafter transmit the packets to the server, for speech recognition processing.

The server comprises the capability to receive packets of encoded audio speech from one or more clients at a time. The server can decode each of the received audio speech packets as they are received, and store the resultant original, or raw, audio speech into one or more buffers associated with the client transmitting the packets of encoded audio speech. The server evaluates the resultant original audio speech from each of the clients, and thereafter transmits a respective feedback response to each of the clients, to be provided to their user.

Other objects, features, and advantages of the present invention will become apparent upon consideration of the following detailed description and the accompanying drawings, in which like reference designations represent like features throughout the figures.

DETAILED DESCRIPTION OF THE INVENTION

In the following description, for purposes of brevity, certain well-known structures and devices are either not shown, or are shown in block diagram form.

Speech recognition can be used for a variety of purposes, including dictation, voice command, and interactive learning functions, e.g., interactive language learning. For many of these purposes, including interactive language learning, speech recognition is used to resolve user-spoken words or phrases into a command and/or control for an application. For example, in an interactive language learning application, the application program knows what word or phrase a user is expected to speak, and can then compare what it has expected with what the user has actually verbalized. In this manner, the application program can provide results, or feedback, to the user on how correct they were in stating the proper word or phrase.

In an embodiment of a speech recognition application for implementation in interactive language learning, speech recognition is generally used for two main purposes. First, speech recognition is employed in grammar context situations, in order that users may learn which words and phrases of a language to use in specific contexts. Second, speech recognition is utilized for pronunciation exercises, to help users learn to correctly pronounce words in a respective language.

The Network

Figure 1:
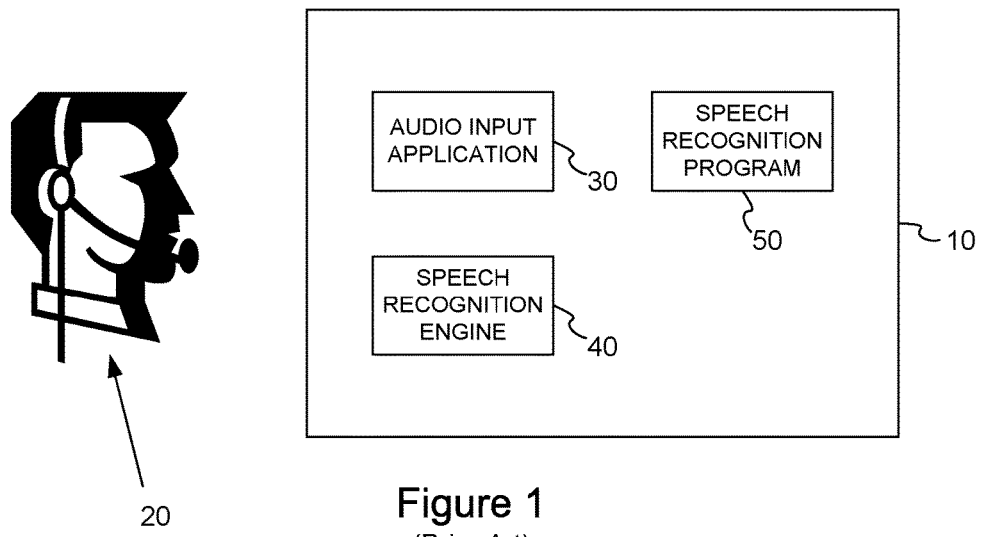
FIG. 1 depicts a prior art client supporting local speech recognition exercises.
Figure 2:
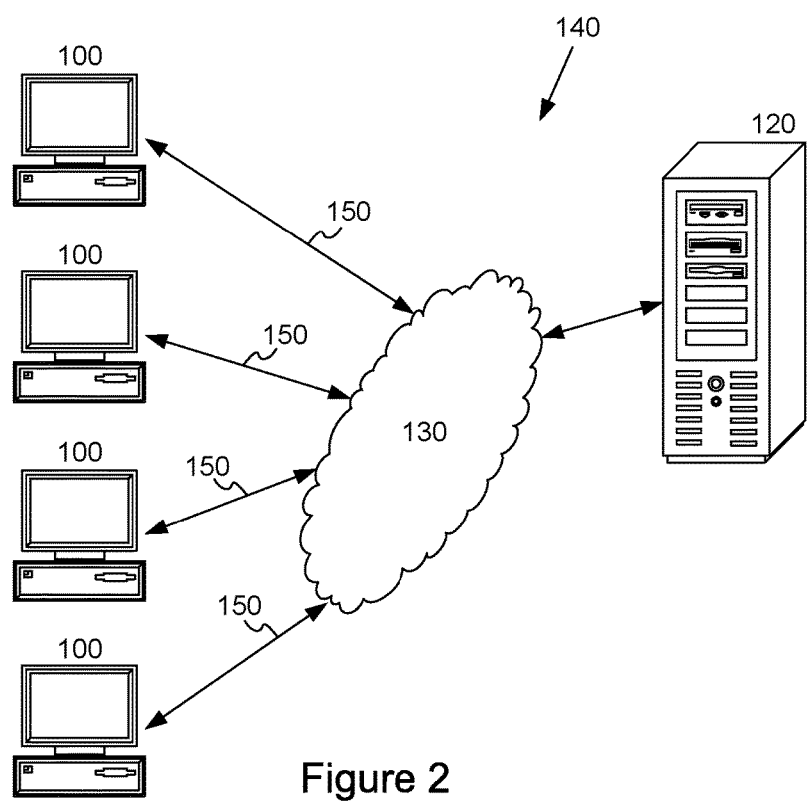
FIG. 2 depicts an exemplary network for supporting speech recognition over the Internet.

In an embodiment for speech recognition processing over the Internet, e.g., for interactive language learning, users use local processing devices, i.e., clients, to communicate with a server supporting speech recognition activities and exercises via the Internet. In an embodiment network 140 supporting speech recognition over the Internet, as shown in FIG. 2, a plurality of clients 100 can each communicate with a server 120 supporting speech recognition services via the Internet 130. In an embodiment, a client 100 is a personal computer, work station, or other device capable of receiving audio input via a microphone or other audio input device from a user, playing an audio output stream via one or more speakers or other audio output device to a user, and communicating via the Internet 130. When the user of a client 100 wishes to communicate with the server 120 for speech recognition activities, the user selects the URL (Uniform Resource Locator), or address, of a file on the server 120 that supports speech recognition processing. A browser running on the client 100 will establish a TCP/IP (Transmission Control Protocol/Internet Protocol) connection 150 to the Internet 130, and issue the URL via this TCP/IP connection 150.

Information and messages are broken down into smaller pieces, or packets, to be transmitted on the Internet from a source to a destination. TCP breaks down and reassembles the packets, while IP is responsible for ensuring the packets are transmitted to the proper destination. Each packet is given a header that contains a variety of information, including the order in which the packet is to be reassembled with other packets for the same transmitted message or information. Each packet is put into a separate IP envelope for transmission over the Internet 130. The IP envelopes contain addressing information that tells the Internet 130 where to send the packet, i.e., the destination address. All IP envelopes containing packets for the same transmitted message or information have the same addressing information, in order that they are all transmitted to the same destination location, and thereafter, properly reassembled. Each IP envelope also contains a header that includes information such as the source, or client's, address, the destination address, the amount of time the packet should be maintained before being discarded, etc.

In an embodiment of a speech recognition activity for interactive language learning, a user requests, via their client, an HTML (Hypertext Markup Language) file comprising a web page for use in a speech processing exercise from the server supporting speech recognition. The proper HTML file is returned to the client from the server, via the Internet, and the client's browser displays the text, graphics and multimedia data of the file on the client's screen. The user may then perform various language learning exercises at the direction of the displayed web page.

In an embodiment, to enable a client 100 to use speech recognition, e.g., for interactive language learning over the Internet 130, when a user subscribes to the language learning service, applications that support the processing of speech recognition are downloaded from the server 120 and installed to the user's client 100. These downloaded applications are thereafter run on the client 100 during the execution of the speech recognition exercises.

The Client

In order to support speech recognition processing, e.g., for interactive language learning, via the Internet, a user must access the speech recognition program on a server, which may or may not be remotely located from the client. The user may then speak into a microphone or other audio input device connected to their client, and thereafter, receive a response, or feedback, to their verbalization from the speech recognition program. Responsive feedback from the speech recognition program may be in the form of text, graphics, audio, audio/visual, or some combination of these.

Figure 3:
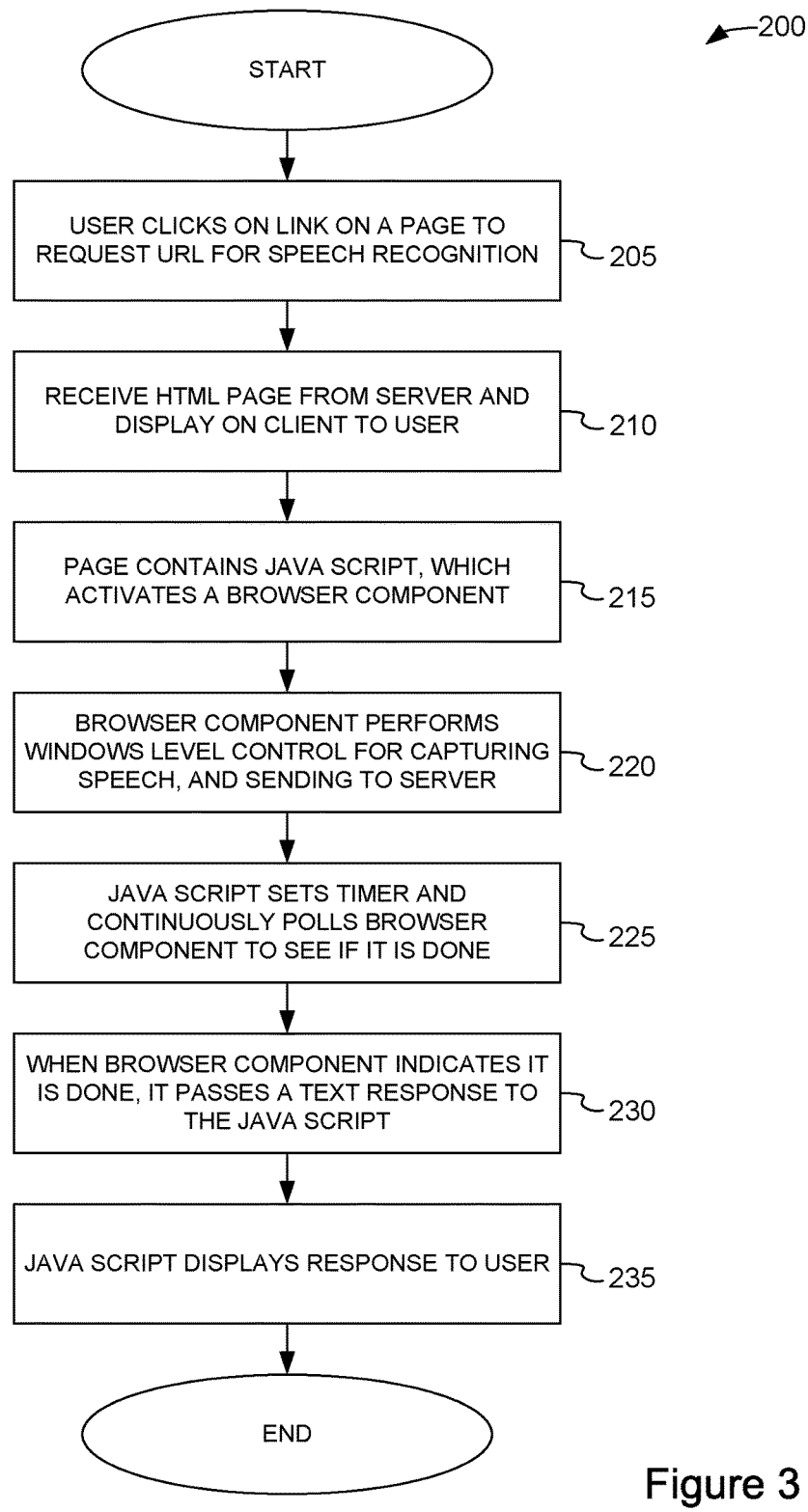
FIG. 3 depicts a speech recognition processing flow.

An embodiment of speech recognition processing (200), e.g., for interactive language learning, as shown in FIG. 3, begins when a user clicks on, or otherwise selects, a link on a web page to request a URL for speech recognition 205. As is known in the art, the URL indicates a location on the web that the user wishes to access. The client's browser sends the URL request to the server supporting the speech processing application, via the Internet.

The client thereafter receives an HTML file comprising a web page for use in a speech recognition exercise from the server, and the client's browser displays the text, graphics and multimedia data of the file to the user 210. When the user thereafter selects a speech processing exercise via the displayed web page, java script associated with the selected exercise activates a browser component 215. The browser component performs windows level control for capturing speech from the user, sending it to the server performing the speech processing, and thereafter receiving a response from the server 220. The java script sets a timer to use in polling the browser component to see if it is done; i.e., to see if it has received a response from the server 225. When the browser component is finished, it passes the response from the server to the java script 230. The java script then displays, or otherwise provides, the response to the user 235.

In an embodiment, a text response is returned from the server, which is displayed on a portion of the screen already displaying the current web page for the speech recognition exercise accessed by the user. In an alternative embodiment, an entirely new HTML page is returned from the server, which is displayed as a new web page to the user, via the client screen.

When the user selects a speech recognition exercise on the displayed web page, the activated browser component is provided a grammar reference indication, to indicate what exercise the user has selected to perform. The browser component establishes a TCP/IP connection with the server, for transmitting user speech data for processing to the server. The grammar reference indication, or an appropriate representation of it, comprises part of the URL sent to the server to establish the TCP/IP connection. In this manner, the server is apprised of the speech recognition exercise the user is accessing, and the speech to expect from the user.

Figure 4:
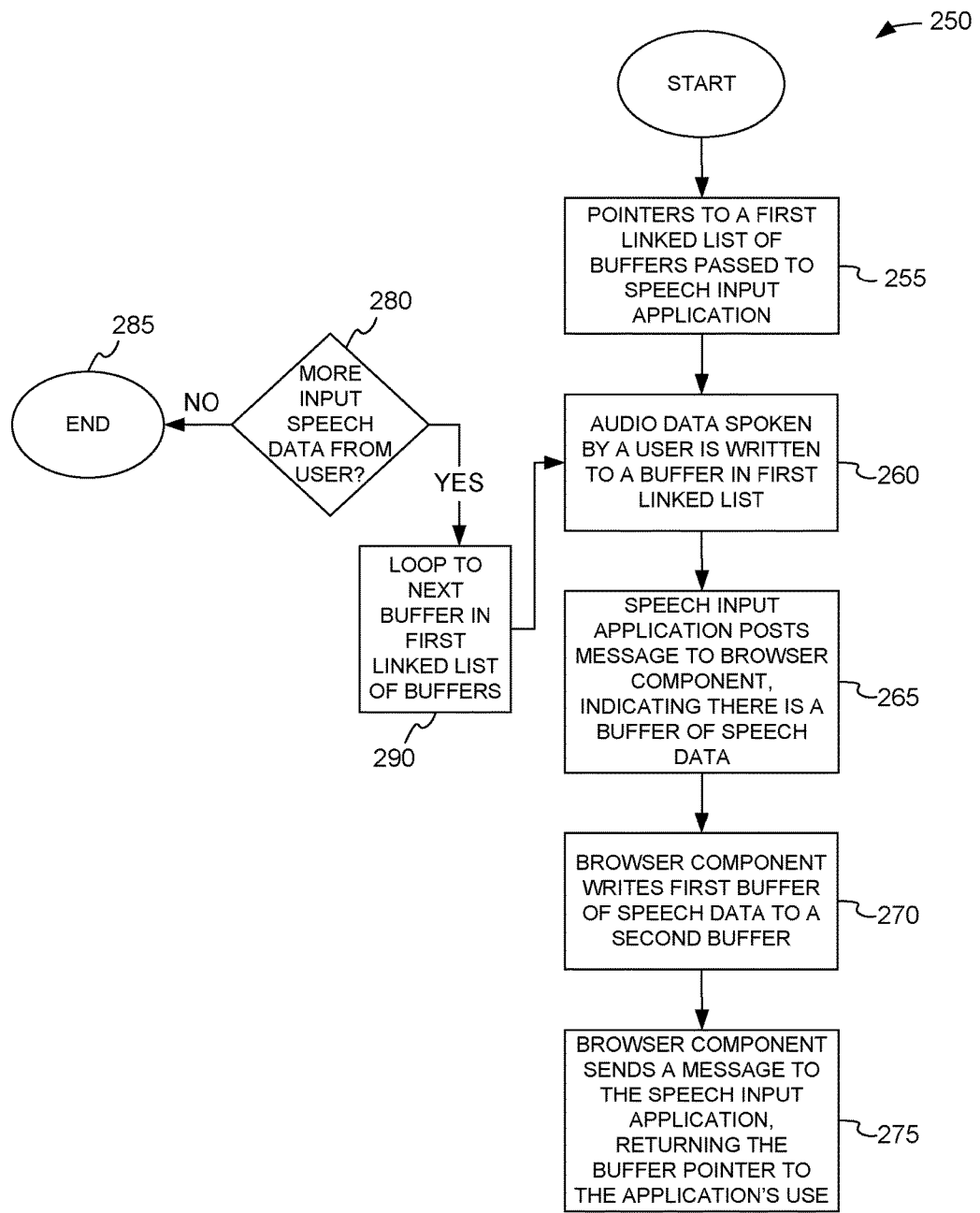
FIG. 4 depicts a speech capture thread processing flow.

When a user selects a speech recognition exercise involving the user speaking, the client essentially executes a speech capture thread 250, as shown in FIG. 4. Pointers to a first linked list of buffers are passed from the browser component to a speech input application for handling the input of user speech from a microphone or other connected audio input device to the client 255. In an embodiment, a WaveIn API by Microsoft Corporation, with headquarters in Redmond, Wash., USA, is used to capture a user's speech data into the buffers. Other appropriate software application(s), either commercial or proprietary, however, may be used to capture user's speech. The audio data spoken by the user is written to a buffer as it is input from the audio input device 260.

In an embodiment, the first linked list of buffers comprises twenty buffers, each capable of holding one-tenth of a second of uncompressed audio, user speech, data. This small buffer size was chosen in order to reduce the latency time from when a user first begins to speak into an audio input device attached to the client, until the speech data is transmitted to the server for speech recognition processing. Larger capacity buffers will require correspondingly larger latencies, which will ultimately nullify any attempts at real-time speech recognition processing.

When a buffer is full, with one-tenth second of raw, uncompressed speech, or the speech input application determines that there is no more speech to be received from the user, the speech input application posts a message to the browser component indicating the buffer pointer of the current buffer containing input speech 265. The browser component, upon receiving the message, writes the speech input application's buffer of speech to a second buffer, in a second linked list of buffers 270. The browser component thereafter sends a message to the speech input application, returning the buffer pointer, and thus the buffer from the first linked list of buffers, to the speech input application's use 275.

In an embodiment, the second linked list of buffers maintained by the browser component comprises an indeterminate number of buffers that are accessed as needed. In an alternative embodiment, the second linked list of buffers is a predefined number of buffers, that when all full, indicates an error in the speech recognition processing. In this alternative embodiment, buffers of speech from the second linked list of buffers are expected to be transmitted to the server before all of the buffers become full; if all the buffers become full, a processing error has occurred between the client and server.

As noted, the speech input application writes one-tenth second of raw, uncompressed speech data to a buffer at a time. The speech input application determines if there is more input speech from the user 280, and if yes, loops to the next buffer in the first linked list of buffers, and writes the next one-tenth second of speech to this new input buffer, for providing to the browser component 290. When the speech input application determines that there is no more speech input from the user, it ends processing 285.

Figure 5:
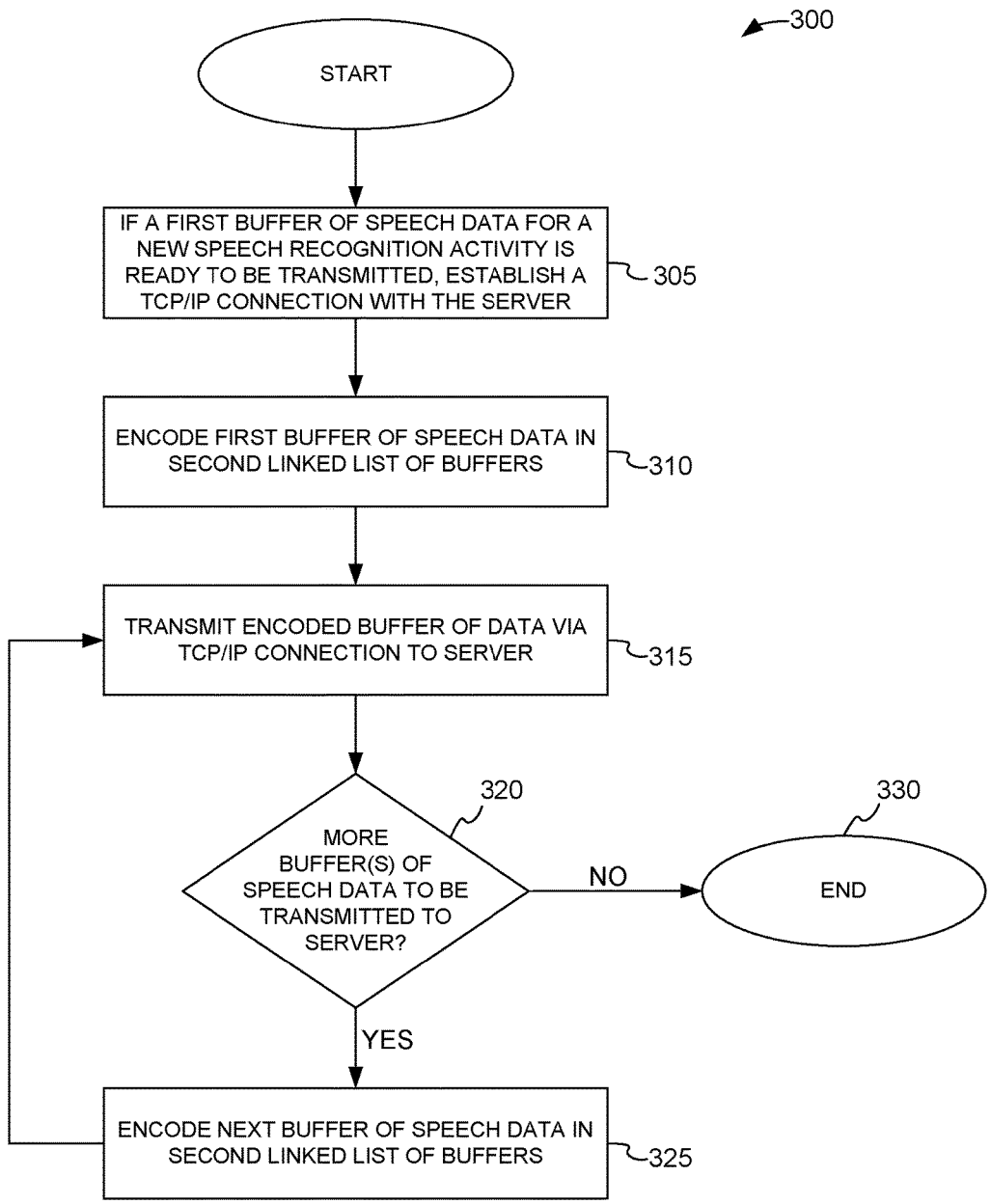
FIG. 5 depicts a speech transmission thread processing flow.

When the browser component receives a first message, indicating a first buffer containing raw speech data is to be transmitted to the server, it activates, or otherwise performs, a speech transmission thread 300, an embodiment of which is shown in FIG. 5. In an alternative embodiment, the speech transmission thread 300 is part of the speech capture thread 250. The speech transmission thread's main function is to continually write as many bytes of compressed audio packet data onto a TCP/IP channel to the server supporting speech recognition processing as can be sent, as soon as there is data ready to be transmitted. Thus, latencies in waiting to receive all the speech from a user, and thereafter process it for transmission to a server, and transmit it, are eliminated, as the speech transmission thread 300 begins sending speech data to the server approximately one-tenth second after the user initiates speaking.

The speech transmission thread (300) establishes a TCP/IP connection with the server supporting speech recognition processing if there is a first buffer in the second linked list of buffers ready to be transmitted for a new speech recognition exercise 305. The speech transmission thread (300) also encodes, or otherwise compresses, a first buffer of speech data in the second linked list of buffers, maintained by the browser component 310. The speech data is encoded, or compressed, to reduce the size of the data to be transmitted over the Internet. The speech transmission thread (300) then transmits the buffer of encoded speech data via the established TCP/IP connection to the server, for speech recognition processing 315. The speech transmission thread (300) then checks if there is another buffer of speech data in the second linked list of buffers to be transmitted 320.

If there are more buffers of speech data to be transmitted to the server, the speech transmission thread (300) encodes, or compresses, the next buffer of speech data in the second linked list of buffers 325. The speech transmission thread (300) thereafter transmits this newly encoded buffer of speech data via the established TCP/IP connection to the server 315.

If there are no more buffers of speech data to be transmitted to the server at this time, the speech transmission thread (300) sleeps, in effect, ending the speech transmission thread (300) processing at that time 330. Additionally, if there is no room in the TCP/IP buffer, used for buffering packet data for transmission on the TCP/IP channel, the speech transmission thread (300) also sleeps.

In an embodiment, the speech transmission thread (300) encodes, or otherwise compresses, a buffer of audio, or speech, data using an ACELP® application from Sipro Lab Telecom Inc., a privately owned Canadian corporation. The ACELP® (Algebraic-Code-Excited Linear Prediction Vocoder) application is capable of reconfiguring, or otherwise re-representing, voice data that will thereafter comprise small enough files to support transmission via 56K, and even 28K, modems, which are the general capability modems of many processing devices, i.e., clients, in use today. Further, the ACELP® application does not simply compress the raw audio file; it reproduces the sound of a human larynx into a considerably smaller file representation. Encoding, or otherwise compressing raw speech data using ACELP®, therefore, allows quality speech data to be configured in small enough files for effective transmission by 28K modems in essentially real-time.

In an alternative embodiment, other appropriate software application(s), either commercial or proprietary, may be used to encode, or otherwise compress, raw speech data.

Figure 6:
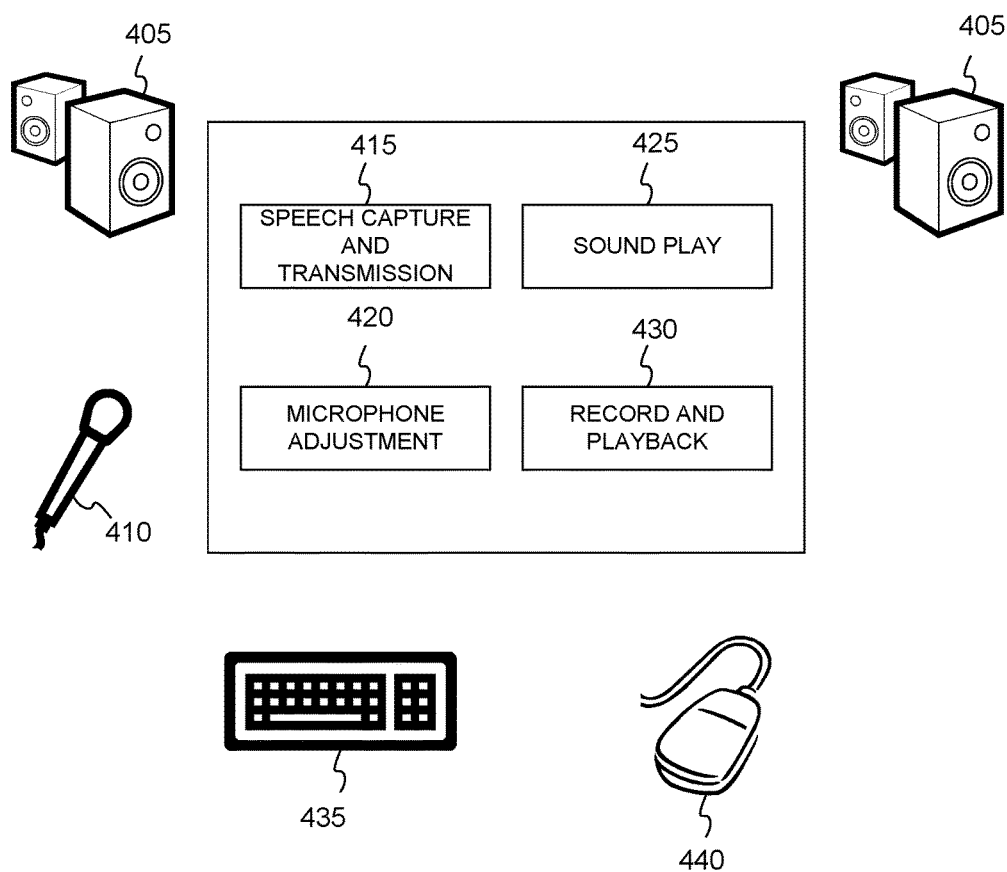
FIG. 6 depicts an exemplary client supporting speech recognition over the Internet.

An embodiment of a client 400, as shown in FIG. 6, comprises a screen for displaying web pages (not shown), and a keyboard 435 and/or mouse 440 and/or other suitable command and control client input device. The client 400 further comprises hardware, e.g., a sound card (not shown); an application, or applications, that supports the speech capture thread (250) and the speech transmission thread (300) processing 415; a microphone adjustment application 420; a sound play application 425 that supports outputting audio to the user; and a record and playback application 430, further described below. One or more speakers 405, or other audio output device(s), and a microphone 410, or other audio input device(s), e.g., a headphone set, are connected to and interact with the client, for speech recognition activities, including response and feedback support.

Generally, a microphone 410 that is connected to and interacts with a client 400 can be adjusted to more accurately and properly capture sound intended to be input to the client 400. Microphone adjustments in a Windows environment on a typical client, however, are generally fairly complicated, involving many level adjustments. Moreover, most users are not aware that the microphone can be adjusted, and/or cannot easily locate the application on their client for supporting such an adjustment.

In an embodiment, whenever a web page displayed on a client 400 supports a speech recognition exercise involving user speech, a corresponding link to a microphone adjustment application 420, or mike wizard, installed on the user's client is also provided. In an alternate embodiment, the microphone adjustment application 420 may be resident on the server, and the corresponding link on the respective web page locates this application on the server. Upon selecting the link to the microphone adjustment application 420 on the server, the application 420 is then downloaded to the client.

The microphone adjustment application 420 supports and directs user interaction to adjust the microphone 410 connected to the client 400 with a minimum amount of level adaptations required to support speech recognition processing. Once the user is satisfied that the microphone's levels are adequately adjusted, control is passed back to the web page supporting the speech recognition exercise.

As discussed, an embodiment of a client 400 comprises a sound play application 425, supporting playing sound to a user, e.g., for providing an audio reply. For example, an audio reply can be used in conjunction with, or as an alternative to, a text response from the server that is displayed to the user via the client screen, in response to a speech recognition exercise, as previously discussed with regard to FIG. 3.

Figure 7:
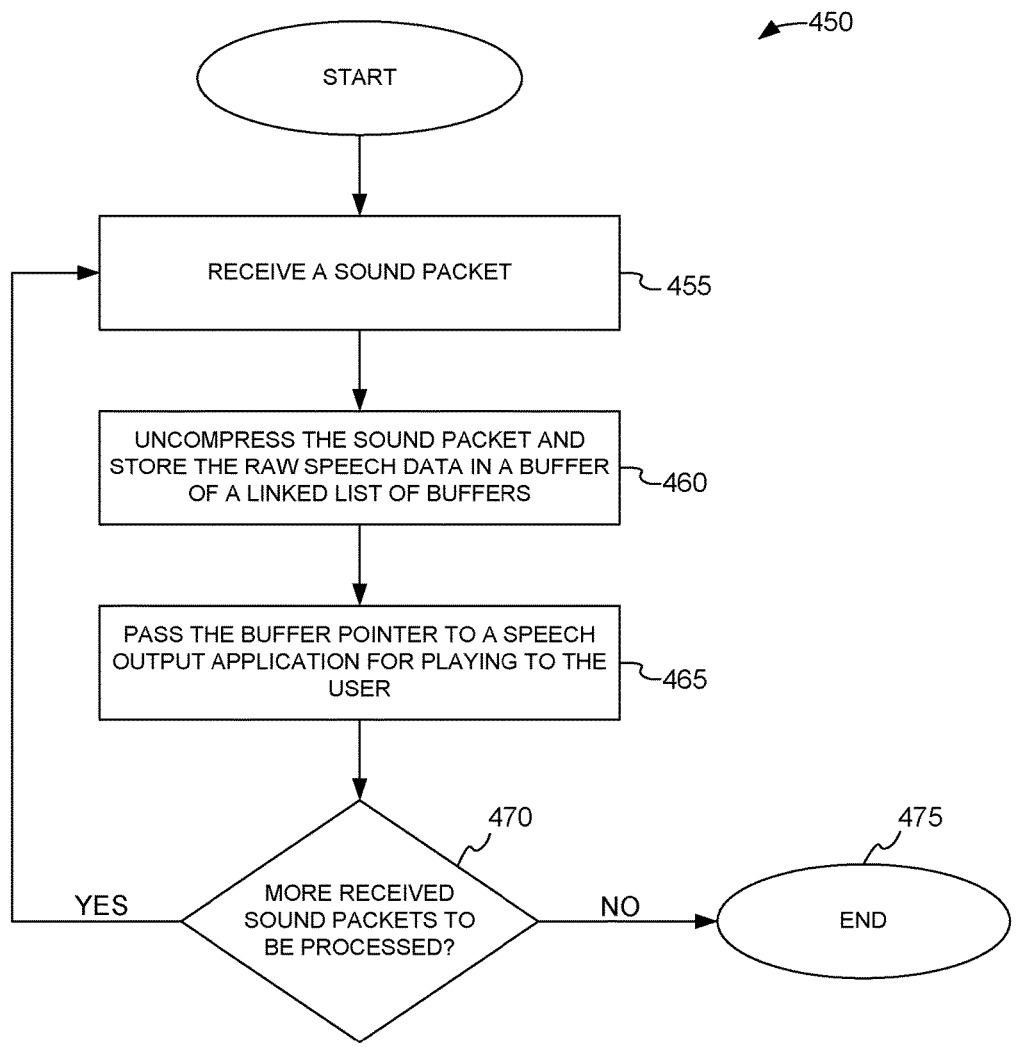
FIG. 7 depicts a sound play thread processing flow.

In an embodiment of a sound play thread 450, shown in FIG. 7, the client receives a packet of encoded, or compressed, sound data from a server via a TCP/IP connection 455. The sound play thread (450) decodes, or decompresses, each sound packet as it is received, and stores the raw speech data in a buffer of a linked list of buffers 460. A buffer pointer to a buffer of raw speech data to be output to a user is then passed to a speech output application, for playing to the user 465. The sound play thread (450) then determines if there are any more incoming sound packets to process 470. If no, the sound play thread (450) is ended 475. If, however, there is another incoming sound packet to be processed, the sound play thread (450) receives the new sound packet 455 for processing for output to the user.

In an embodiment, received sound packets are decoded, or otherwise decompressed, into the original raw sound, or speech, data using the ACELP® application from Sipro Lab Telecom Inc. In an alternative embodiment, other appropriate software application(s), either commercial or proprietary, may be used to decode, or otherwise decompress, received sound packets.

In an embodiment, the sound play thread (450) polls the TCP/IP connection to determine if there is encoded speech data available from the server, and if there is, inputs the currently transmitted sound packet 455. In an alternative embodiment, the client receives sound packets transmitted from the server via an interrupt service routine as they become available on a client input port.

In an embodiment, a WaveOut API, by Microsoft Corporation, is used to output the speech data transmitted from the server to a user, via the client's audio output device. The sound play thread (450) passes a buffer pointer of raw speech data to the WaveOut API, for playing to the user. The WaveOut API, when it can handle more speech data for output, calls the sound play thread (450) to pass it another buffer pointer of speech data. This interactive processing between the sound play thread (450) and the WaveOut API continues until all the current speech data is played to the user, or until a detectable, unrecoverable error occurs. Once all the output speech data is played to the user, and the WaveOut API calls the sound play thread (450) for more output speech data to process, the sound play thread (450) closes, or stops, the WaveOut API.

In an alternative embodiment, other appropriate software application(s), either commercial or proprietary, may be used as the speech output application.

As noted, the sound packets transmitted from a server supporting speech recognition to a client are reconfigured into files of original raw sound, or speech, data as they are received from the server by the client. This eliminates latencies incurred waiting for all packets of a representative speech, or audio, file to first be input, before being processed for playing to a user. In this manner, a responsive audio file to a user's speech recognition exercise may be played to a user in approximately real-time, with the user experiencing no quantifiable delays from initiating speech to receiving a resultant audio response.

As discussed, an embodiment of a client 400 of FIG. 6 comprises a record and playback application 430. The record and playback application 430 allows a user to record a word or phrase. Then, both the recorded word or phrase and an audio, or speech, file containing the same spoken word or phrase correctly enunciated can be played to the user, in order that the user may compare the pronunciation of their recordation with that in the "correct" speech file.

Figure 8:
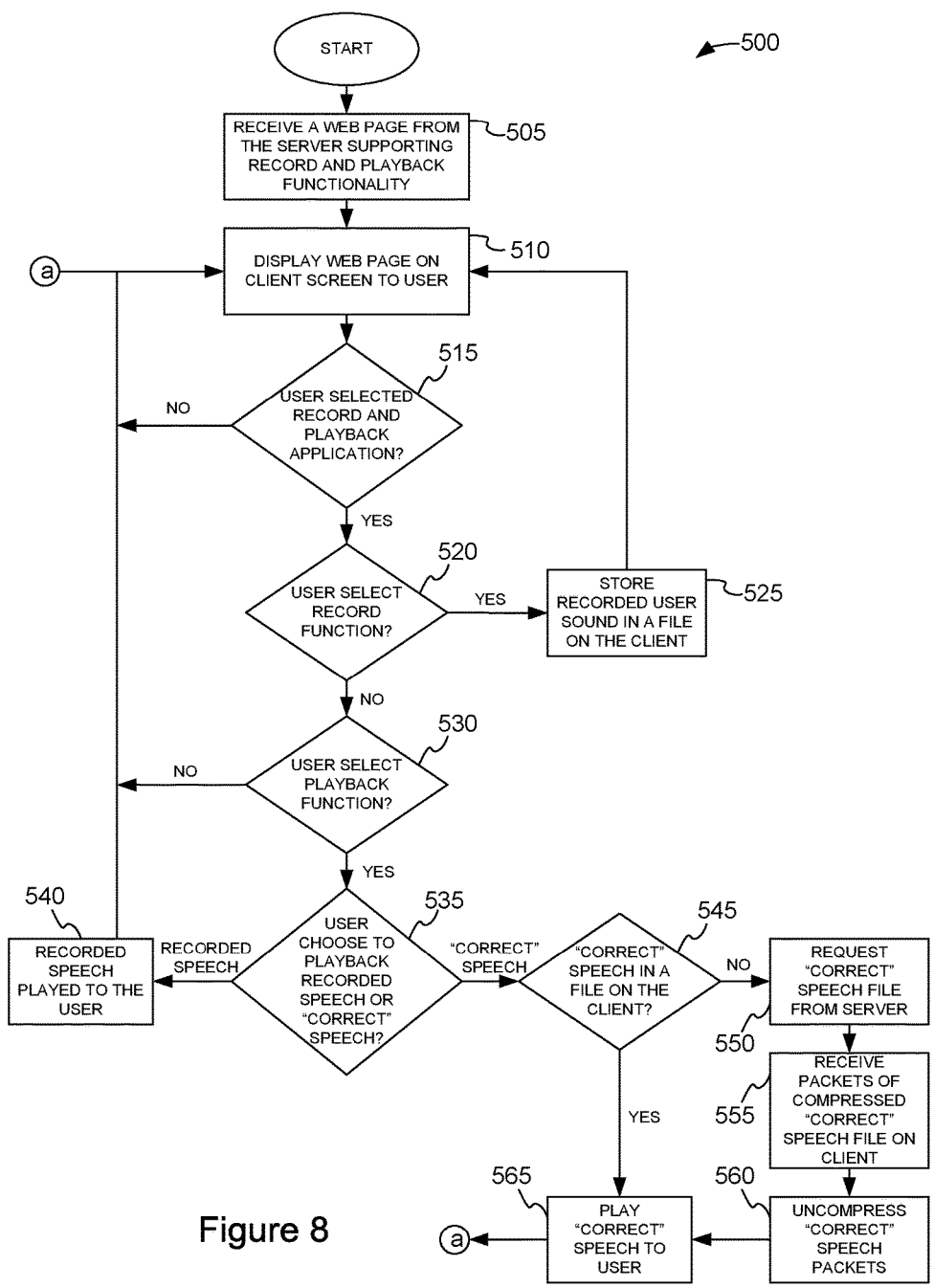
FIG. 8 depicts a record and playback thread processing flow.

In an embodiment of a record and playback processing thread 500, as shown in FIG. 8, the client receives an HTML file from the server, to be displayed as a web page, which supports a record and playback application 505. The client displays the web page on the client screen to the user 510. The record and playback processing thread (500) then determines if the user has selected the record and playback application 515. If the user has not, the client simply continues to display the current web page to the user 510. If, however, the user has selected the record and playback application, the web page indicates a word or phrase the user may record and then playback, or the user may choose to listen to a recording of the same word or phrase enunciated correctly.

The user selects either the record function or the playback function, via the displayed web page. The playback processing thread (500) determines the function chosen by the user, and if the user has selected the record function, or button, 520, the user's speech for the indicated word or phrase is captured and stored on the client 525. The client continues to display the current web page to the user 510.

In an embodiment, the user's speech, for the record function, is captured via the client's audio input device with a Microsoft API, which inputs user speech for a selected amount of time, and writes the inputted speech to a designated file in client memory.

In an alternative embodiment, the user's recorded speech of the indicated word or phrase is written to a buffer, and then encoded, or compressed, in order that it may be stored on the client with a minimum amount of memory usage. The user's speech is captured in one or more small input buffers, e.g., a first linked list of buffers each comprising storage capability for one-tenth of a second of uncompressed speech data, by a speech input application. In an embodiment, the speech input application is Microsoft's WaveIn API.

When an input buffer becomes full, or it is determined that the user has stopped speaking, the input buffer of raw speech data is encoded, or compressed, and stored in a file, or second linked list of buffers in client memory. In this embodiment, the input speech data is encoded in real-time, thus eliminating subsequent time delays involved in inputting all the speech first, before thereafter encoding it and saving it to client memory.

If the user has not selected the record function, or button, the record and playback processing thread (500) determines if the user has selected the playback function, or button, 530. If no, the client continues to display the current web page on the client screen 510.

If the user opts for the playback function, they must further determine whether to playback their own, previously recorded, speech, or to playback the "correct" speech file, supported by the speech recognition processing and comprising the correct pronunciation of the indicated word or phrase. The record and playback processing thread (500) determines whether the user has chosen to playback their recorded speech file or the "correct" speech file 535. If the user has selected to playback their recorded speech file, their stored speech file is retrieved from client memory and played to the user 540. The record and playback processing thread (500) continues to display the current web page to the user 510.

In an embodiment, the user's recorded speech file is retrieved from client memory, decoded, and passed via buffers to a speech output application, for playing to the user via a client audio output device. In an embodiment, the speech output application is Microsoft's WaveOut API.

If the user has alternatively selected to play the "correct" speech file, it is determined whether that file is stored on the client or the server 545. In an embodiment, all "correct" speech files, comprising the correct pronunciation of indicated words and phrases and used in the record and playback application processing, are stored on the server. The record and playback processing thread (500) requests the "correct" speech file from the server, via a URL 550. Packets of encoded "correct" speech file data are then received by the client 555, as they are transmitted from the server. The encoded "correct" speech file packets are decoded as they are received 560, and the resultant raw "correct" speech is played to the user 565. The record and playback processing thread (500) also continues to display the current web page to the user 510.

In an embodiment, the packets of "correct" speech data transmitted from the server are decoded by the client, and stored in a linked list of buffers for processing by a speech output application. In an embodiment, the speech output application is Microsoft's WaveOut API. As buffers of "correct" speech data are received from the server and decoded, pointers to the buffers of the resultant raw correct speech data are provided to the speech output application, which then plays the speech data to the user. In this manner, latencies inherent in waiting for the entire encoded "correct" speech file to be transmitted, before being decoded and then played to the user, are eliminated.

In an alternative embodiment, all "correct" speech files are stored in client memory, as part of the installation of the speech recognition applications on the client. If the "correct" speech files are stored on the client, the record and playback processing thread (500) retrieves the proper speech file from client memory and outputs it to the user 565. The record and playback processing thread (500) also continues to display the current web page on the client screen 510.

In this alternative embodiment, all "correct" speech files stored on the client are encoded, or compressed. The record and playback processing thread (500) decodes the stored "correct" speech file, and then provides portions of the file, as they are decoded, via buffers, to a speech output application, for playing to the user. In an embodiment, the speech output application is Microsoft's WaveOut API.

In yet another alternative embodiment, some "correct" speech files are stored on the client, as part of the installation of the speech recognition applications on the client, while other "correct" speech files are stored on the server. In this other alternative embodiment, the record and playback processing thread (500) determines if the required "correct" speech file is stored on the client or the server, and retrieves it from the appropriate location, prior to processing it for playing to the user.

The Server

As previously discussed with respect to FIG. 2, in a network 140 supporting speech recognition, a plurality of clients 100 can each communicate with a server 120 supporting speech recognition services, e.g., for language learning, via the Internet 130. In an embodiment, in order to support speech recognition processing for respective clients 100, the server 120 executes a speech processing thread.

Generally, the speech processing thread is responsible for accepting encoded audio, or speech, data packets from a client, decoding the audio packets into their original raw speech data, evaluating the raw speech data via a command and control speech engine, and transmitting a response, or appropriate feedback, to the client, to be provided to the user. The speech processing thread performs each of these functions as the appropriate data becomes available to it, thereby eliminating any latencies that normally accrue when each of these functions is performed in a pipeline function, one function processing to completion before the next begins.

Figure 9:
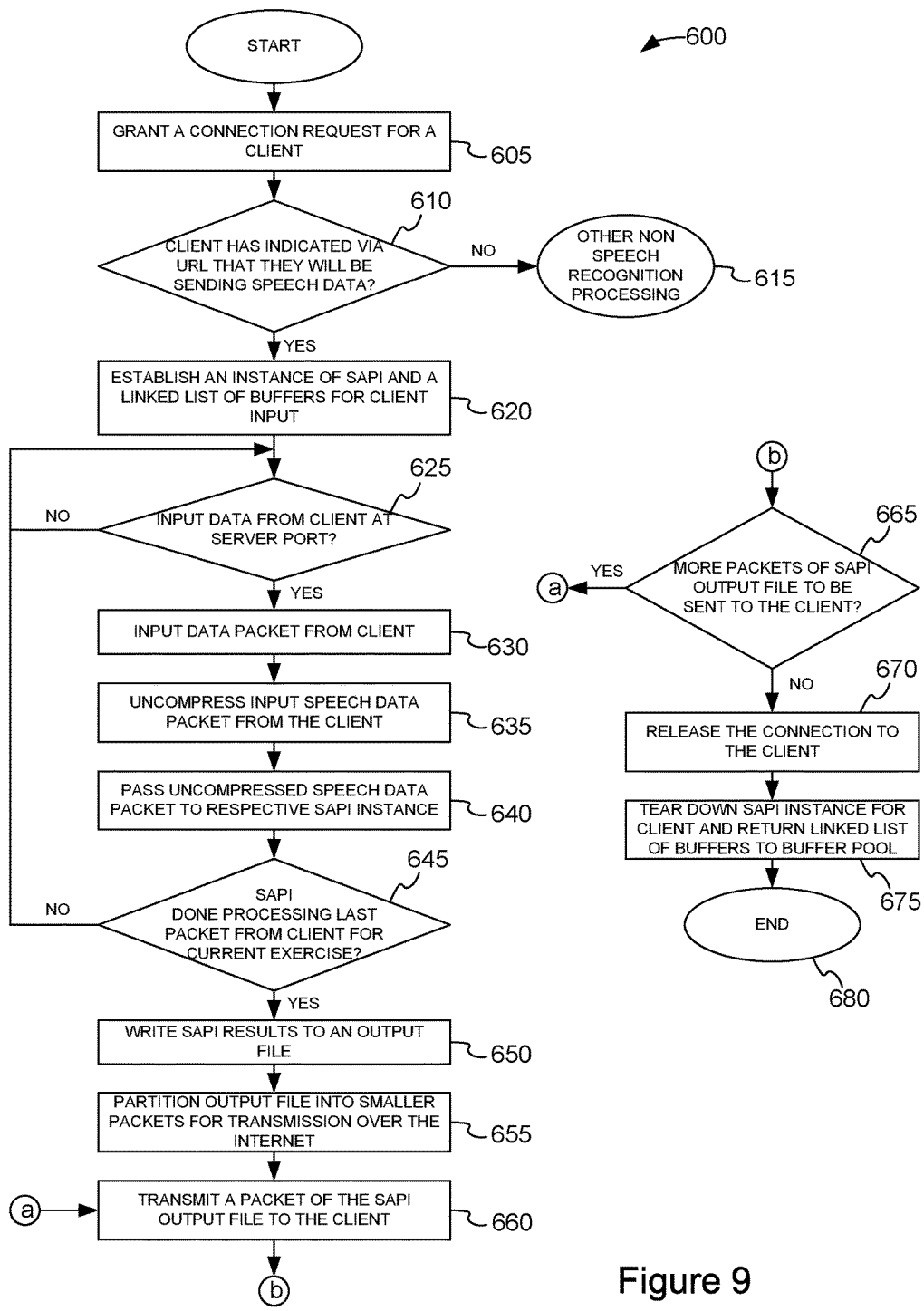
FIG. 9 depicts an embodiment of a speech processing thread flow, executed by a server supporting speech recognition applications.

In an embodiment of a speech processing thread 600, as shown in FIG. 9, a TCP/IP connection is established for a client wishing to access the server 605. The user has clicked on, or otherwise selected, a link on their currently displayed web page, which as previously discussed with reference to FIG. 3, activates a client browser component which initiates and establishes the connection with the server. As part of the connection establishment processing, and determined by the specific link chosen by the user, correlating to a particular speech recognition exercise, a URL indicates to the server that the client will be sending it speech data for a specific speech recognition exercise.

From the URL sent from the client, the server determines whether to expect speech data for processing from the client 610. If the URL does not indicate that speech data will be sent from the client, the speech processing thread (600) on the server branches to other, non-speech, or normal HTML server, request processing 615.

If, however, the client has indicated it will transmit speech data to the server, the speech processing thread (600) establishes an instance of the speech recognition engine supported on the server, as well as a linked list of buffers for the client's input speech data 620.

In an embodiment, the speech engine supported on the server for speech recognition activities is the Command and Control speech recognition engine of Microsoft Corporation's Speech API ("SAPI"). This speech recognition engine comprises an interface that supports the speech processing thread (600), providing it audio, speech, data to be analyzed, i.e., recognized, via small buffers of uncompressed PCM (Pulse Code Modulated) audio data.

In an alternative embodiment, other appropriate software application(s), either commercial or proprietary, may be used as a speech recognition engine for speech recognition processing on the server.

As noted, the incoming connection request to the server from a client is in the form of a URL. This URL contains the necessary context grammar to be used by SAPI's speech recognition engine to recognize and evaluate the received client speech data with regard to the expected, or correct, speech data for the current speech recognition exercise. For example, in an interactive language learning process, the grammar context is used by the speech recognition engine to determine whether a user spoke the correct word or phrase expected for the exercise currently being performed.

An example of a URL for a client connection request to a server for a speech recognition exercise is as follows:

http://www.globalenglish.com/SpeechRecognition/recognize.asp?grammar=101&accurac y=50&threshold=75

This URL includes a grammar reference number of 101, and instructions for the speech recognition engine to use an accuracy of 50 and a threshold of 75. As discussed, the server uses the grammar reference number to determine the expected audio word or phrase from the user, which is passed to the speech recognition engine for processing.

The accuracy number in the URL controls the amount of processor time used to evaluate the user's audio file, and consequently, determines the accuracy of the resultant evaluation of the user's speech. The threshold value in the URL is used by the speech recognition engine for determining the level of recognition to employ for any particular user spoken word or phrase. In general, the larger the threshold value, the more certain the engine must be that the user spoke a particular word or phrase. The threshold value can be used to adjust the speech recognition processing for the level of tolerable false positive recognitions.

The speech processing thread (600) thereafter checks if there is an input packet from the client 625. If no, the speech processing thread continues to check if there is an input packet from the client 625. Once there is an input packet from the client, the speech processing thread (600) inputs the packet data to an input buffer 630. The input, encoded, speech data from the client is then decompressed, and the resultant raw speech data is written to a buffer in the linked list of buffers established for the respective client 635. In an embodiment, the speech processing thread (600) decompresses the buffers of input, encoded, speech data using an ACELP® application from Sipro Lab Telecom Inc. In an alternative embodiment, other appropriate software application(s), either commercial or proprietary, may be used to decompress the buffers of encoded input speech data.

The buffers of decompressed, or raw, speech data are then passed to the respective speech recognition engine, or SAPI, instance, for speech recognition processing 640. Once the SAPI instance has begun processing for a client for a particular exercise, it will notify the speech processing thread (600) if it needs more data. If there are more speech data packets received and decoded, or decompressed, from the client, the speech processing thread (600) will pass them, in order, from the linked list of buffers, to the SAPI instance as requested. If, because of network congestion or other reasons, client speech data is not available when requested by the respective SAPI instance, the SAPI instance's command and control processing is paused until new speech data becomes available for it from the client.

The speech processing thread (600) checks whether the SAPI instance for a client is finished processing the last packet of speech data from the client for the current exercise, or has timed out and discontinued packet processing for the current exercise 645. If the SAPI instance is not finished processing, or otherwise timed out, the speech processing thread (600) continues to check if there is input speech data from the client at a server port 625.

If, however, the SAPI instance has finished processing the last packet from the client for the current speech recognition exercise, or timed out, the speech processing thread (600) writes the SAPI results, or information indicating SAPI timed out, to an output buffer for the client 650. In an embodiment of a speech recognition processing (200) for interactive language learning, the SAPI results describe, or otherwise indicate, what success, if any, the server had in recognizing and evaluating the correctness of the user's speech for the current speech recognition exercise.

In an embodiment, the SAPI results, or the timeout information, is returned as a text response to the client's browser component. The received text response is thereafter passed to the java script for display to the user, as described with reference to FIG. 3 above.

In an alternative embodiment, as also previously noted, the SAPI results of a user's speech recognition exercise are transmitted to the client in a new HTML file, which is received by the browser component, and thereafter passed to the java script for display to the user via the client's screen.

The SAPI results text response, or new HTML file, returned to the client is partitioned by the speech processing thread (600) into one or more, generally smaller, data packets for transmission over the Internet 655. A data packet of the SAPI results is then transmitted to the client 660. The speech processing thread (600) checks whether there are any more data packets of the SAPI results to transmit to the client 665, and if there are, transmits the next data packet 660. If, however, there are no more SAPI results data packets to be transmitted to the client, the speech processing thread (600) releases the TCP/IP connection to the client 670. The speech processing thread (600) also tears down, or otherwise disables or discontinues, the SAPI instance for the client, and returns the linked list of buffers used for the client's speech recognition exercise to the buffer pool 675. The speech processing thread (600) is then ended 680.

In the embodiment of the speech processing thread 600 of FIG. 9, once a client is granted a connection to the server for speech recognition processing 200, the server maintains this connection with the client until the current speech recognition exercise is completed. In this manner, the client's user does not experience delays in receiving the speech recognition feedback information from the server, once the user has initiated the processing and spoken into an audio input device at their client. As connection access delays are eliminated in the speech processing thread 600, the user experiences basically real-time processing results for a speech recognition activity.

Figure 10:
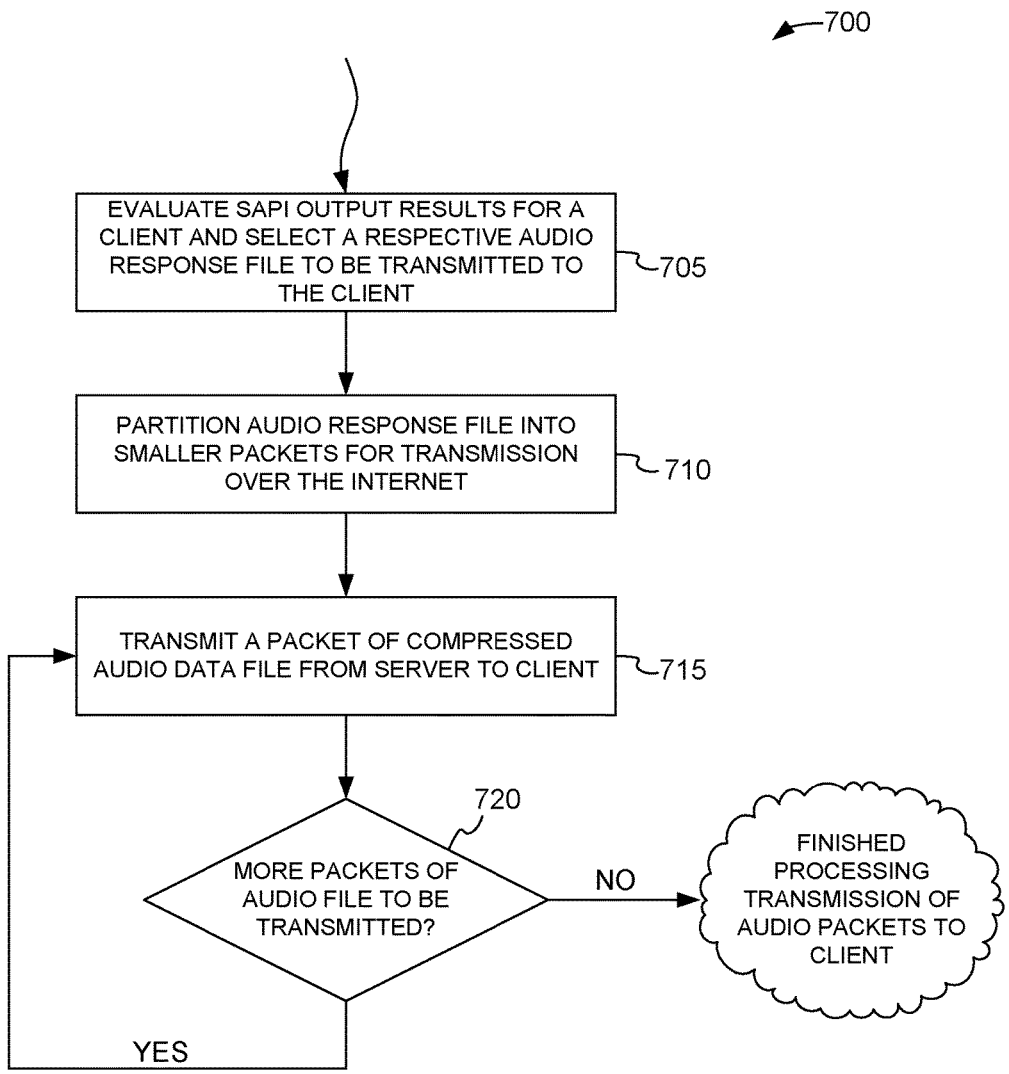
FIG. 10 depicts a speech response thread flow, executed by a server supporting speech recognition applications.

In an alternative embodiment of the speech processing thread 600 of FIG. 9, the server returns a speech response to the client, rather than a text response, or new HTML file. In this alternative embodiment, several speech files are stored on the server in an encoded, or compressed, format, each speech file representing an audio response to a user's speech for a particular speech recognition exercise. As shown in FIG. 10, the respective speech response thread (700) evaluates the SAPI output results for a client and selects an appropriate stored audio response file to transmit to the client 705. The speech response thread (700) partitions the selected compressed audio response file into one or more generally smaller packets for transmission over the Internet 710. A packet of the audio response file is then transmitted to the client 715, via the same TCP/IP connection established by the client to send the user's speech to the server. The speech response thread (700) then checks if there are any more packets of the audio response file to transmit 720. If yes, the next packet is transmitted to the client 715. If, however, there are no more packets of the audio response file to transmit to the client, the speech response thread (700) has finished processing the transmission of a speech response to the client.

In yet another alternative embodiment of the speech processing thread 600, the server returns a text to speech response to the client, in response to the speech recognition processing exercise. In order to properly process a text to speech response, a client must comprise, or otherwise support, a text-to-speech engine that converts words in a transmitted text character string from the server to speech that can be played to the user. One such text to speech engine is Microsoft's Voice Text, incorporated in its Speech API.

In this alternative embodiment employing text to speech responses, the server's output response thread operates similarly to the thread processing described for transmitting audio response files in FIG. 10. The respective output response thread in this alternative embodiment evaluates the SAPI output results for a client and selects an appropriate stored text file to be transmitted to the client. The output response thread partitions the selected text file into one or more generally smaller packets for transmission over the Internet. Packets of the responsive text file are then transmitted to the client, until the entire file is output from the server to the client. At that point, the output response thread has finished processing the transmission of responsive text packets to the client.

On the client side, as it receives the packets of text file, it passes them to its text-to-speech engine, which converts the text to audio data. The audio data is then played to the user.

Figure 11:
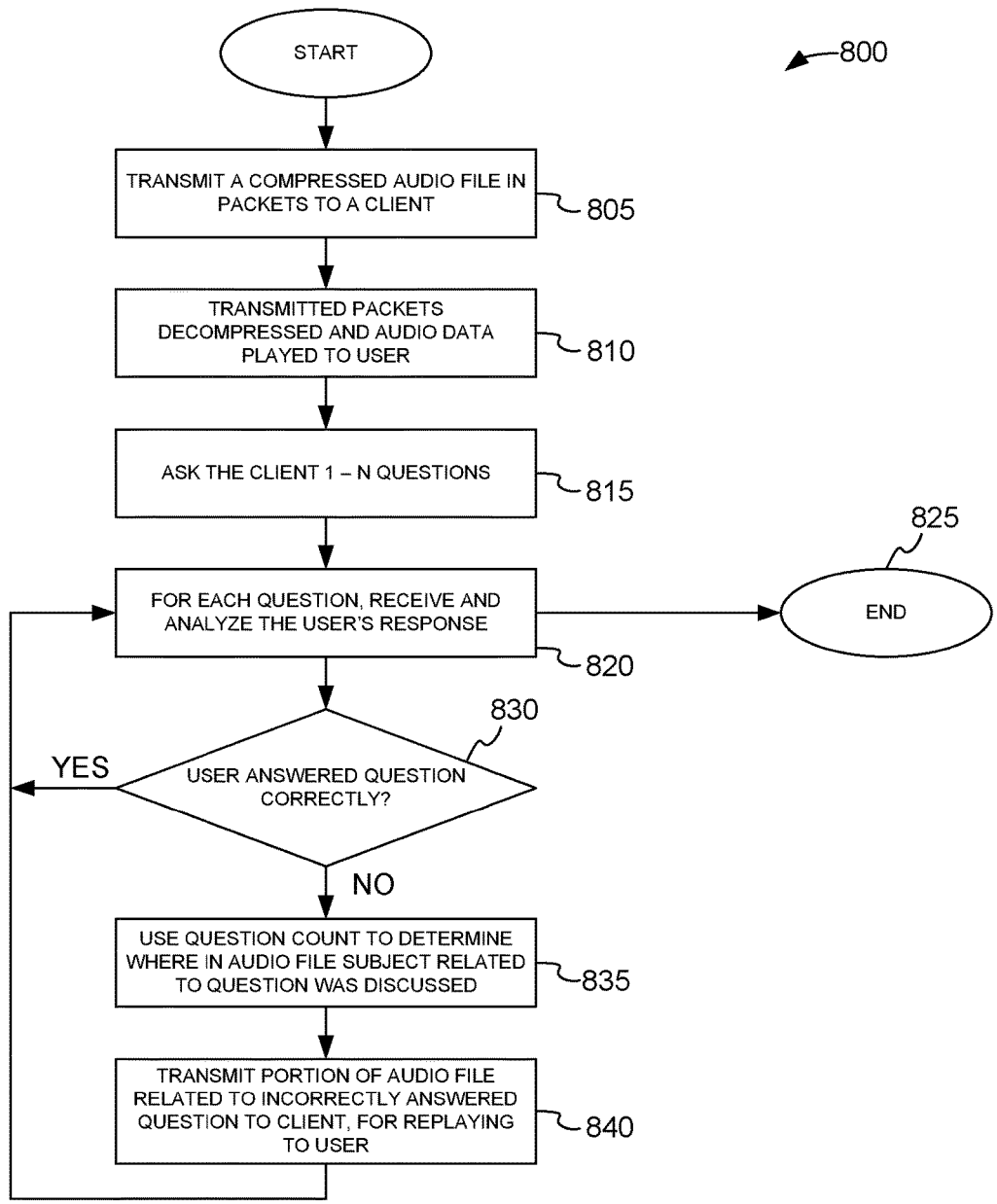
FIG. 11 depicts an audio comprehension application flow.

In yet another embodiment of a speech recognition activity, e.g., for interactive language learning, an audio comprehension application 800 is processed, as shown in FIG. 11. The audio comprehension application 800 embodiment, as shown in FIG. 11, allows a server supporting speech recognition activities to transmit a comprehensive audio file to a client, for playing to a user. The audio comprehension application 800 then evaluates user-answered questions pertaining to the subject of the audio file, and provides appropriate feedback to the user via the client, in a real-time processing environment.

In the audio comprehension application (800), a comprehensive compressed audio file comprising speech by one person, or a dialog between two or more persons, is transmitted in a plurality of packets from the server to the client 805. The transmitted packets are decompressed, or decoded, by the client as they are received, and the resultant audio, or speech, data is played to the user 810. The user is directed by an HTML file displayed on their client screen to answer N number of questions based on the subject matter of the audio file 815.

As the user answers each question, generally by selecting a displayed response via a mouse, keyboard stroke, or other appropriate method for choosing an object in an HTML file displayed on a client screen, the response is transmitted to the server. For each question then, the server will receive and analyze the user's response 820. When all the user's responses have been received and analyzed, the audio comprehension application processing is ended 825.

The server, upon receiving a response from a user to a question, determines if the response is correct 830. If yes, in an embodiment, the server transmits an appropriate reply, either text, audio, audiovisual, or a combination thereof, for the client to provide to the user, to indicate their success. The server then evaluates the next user response, as it is received 820.

If, however, the user response to a question is incorrect, the audio comprehension application (800) uses the question count to determine where in the compressed, or encoded, audio file the subject of the particular question is stored 835. The audio comprehension application (800) then transmits, in packets, only that portion of the compressed audio file that comprises the subject of the incorrectly answered question to the client, for replaying to the user 840. The audio comprehension application (800) thereafter continues to evaluate user responses to questions posed via the HTML file displayed on the user's client screen 820.

In an alternative embodiment, the client stores the comprehensive compressed audio file transmitted from the server in its memory, before decoding, or otherwise uncompressing it, and playing it to the user. If the server determines that a user has incorrectly answered a question, it uses the question count to determine where in the compressed audio file the subject of the particular question is stored. The server then transmits a pointer, or other suitable indicator, to the client, to indicate the relative location of the subject matter in the comprehensive compressed audio file. The client uses the pointer to locate the subject matter in the file stored in its memory, decode, or otherwise uncompress, that portion of the file, and replay it to the user.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   receiving, by a server from a client device, a data transmission including one or more packets encoding voice data, a first value, and a question count identifier;
   processing, by the server, the voice data to generate a response to the voice data, wherein the server processes the voice data for a period of time at least partially determined by the first value; and transmitting, by the server in response to the data transmission, the response to the voice data to the client device, wherein the response is determined by:
    identifying a portion of an audio file using the question count identifier, and
    transmitting the portion of the audio file to the client device.

2. The method of claim 1, wherein the first value includes an accuracy value and the server is configured to process the voice data for an amount of processor time determined by the accuracy value.

3. The method of claim 1, wherein the first value includes a threshold value and the server is configured to process the voice data by applying a threshold level of recognition to a spoken word in the voice data, wherein the threshold level of recognition is determined by the threshold value.

4. The method of claim 1, wherein the response includes text data and the client device is configured to process the text data into audio data.

5. The method of claim 1, wherein transmitting the response to the voice data to the client device over the Internet includes causing a display of visual information on a screen of the client device.

6. The method of claim 1, wherein transmitting the response to the voice data to the client device over the Internet includes causing an output of audio information on an audio output device of the client device.

7. The method of claim 1, wherein the response is communicated from server to a client over the Internet, and causes a speech output on an audio output device of the client device.

8. The method of claim 1, wherein transmitting the response to the voice data to the client device over the Internet includes causing an output of audio and visual information by the client device.

9. A method, comprising:
    transmitting, by a client device to a server, a data transmission including one or more packets encoding voice data and a first value;
    receiving, by the client device from the server, a response to the voice data, wherein the voice data has been processed by the server for a period of time at least partially determined by the first value;
    transmitting, to the server and after receiving the response to the voice data, a request for a correct speech file; and
    receiving, from the server, an audio file that is the correct speech file.

10. The method of claim 9, wherein the first value includes an accuracy value and the server is configured to process the voice data for an amount of processor time determined by the accuracy value.

11. The method of claim 9, wherein the first value includes a threshold value and the server is configured to process the voice data by applying a threshold level of recognition to a spoken word in the voice data, wherein the threshold level of recognition is determined by the threshold value.

12. The method of claim 9, wherein the response includes text data and including processing the text data into audio data.

13. The method of claim 9, including:
    processing the response to the voice data into visual information; and
    displaying the visual information on a screen of the client device.

14. The method of claim 9, including:
    processing the response to the voice data into audio information; and
    outputting the audio information on an audio output device of the client device.

15. The method of claim 9, including:
    processing the response to the voice data into speech output; and
    outputting the speech output on an audio output device of the client device.

16. A system, comprising:
    a server including a processor configured to:
        receive a data transmission from a client device, the data transmission including one or more packets encoding voice data, a first value, and a question count identifier;
        process the voice data to generate a response to the voice data, wherein the voice data is processed for a period of time at least partially determined by the first value; and
        transmit, in response to the data transmission, the response to the voice data to the client device, wherein the response is determined by:
            identifying a portion of an audio file using the question count identifier, and
            transmitting the portion of the audio file to the client device.

17. The system of claim 16, wherein the first value includes an accuracy value and the processor is configured to process the voice data for an amount of processor time determined by the accuracy value.

18. The system of claim 16, wherein the first value includes a threshold value and the processor is configured to process the voice data by applying a threshold level of recognition to a spoken word in the voice data, wherein the threshold level of recognition is determined by the threshold value.

19. The system of claim 16, wherein the processor is configured to:
    execute one or more speech processing threads; and
    input the voice data into the one or more speech processing threads for processing.

20. The system of claim 16, including a storage device configured to store a plurality of response data files and wherein processing the voice data to generate a response to the voice data includes identifying a first response data file in the plurality of response data files using the voice data and the response to the voice data includes at least a portion of the first response data file.

* * * * *